US009247716B2

(12) United States Patent
Wilson et al.

(10) Patent No.: US 9,247,716 B2
(45) Date of Patent: Feb. 2, 2016

(54) DOG HARNESS

(71) Applicants: Danny Wilson, Kanahooka (AU); Sylvia Wilson, Kanahooka (AU)

(72) Inventors: Danny Wilson, Kanahooka (AU); Sylvia Wilson, Kanahooka (AU)

( * ) Notice: Subject to any disclaimer, the term of this patent is extended or adjusted under 35 U.S.C. 154(b) by 0 days.

(21) Appl. No.: 14/274,509

(22) Filed: May 9, 2014

(65) Prior Publication Data

US 2014/0245970 A1 Sep. 4, 2014

Related U.S. Application Data

(63) Continuation-in-part of application No. PCT/GB2012/051209, filed on May 29, 2012, and a continuation-in-part of application No. 14/240,728, filed on Feb. 25, 2014.

(51) Int. Cl.
*A01K 27/00* (2006.01)
*A62B 35/00* (2006.01)

(52) U.S. Cl.
CPC .................... *A01K 27/002* (2013.01)

(58) Field of Classification Search
USPC ......... 119/712, 756, 864, 769, 792, 856, 907, 119/863, 771, 905, 793, 797, 795, 858; D30/151, 152
See application file for complete search history.

(56) References Cited

U.S. PATENT DOCUMENTS

| | | | | |
|---|---|---|---|---|
| 6,481,384 | B2 * | 11/2002 | Jacobs .......................... | 119/864 |
| D599,504 | S * | 9/2009 | Halip et al. .................. | D30/152 |
| 7,963,256 | B1 * | 6/2011 | Horgan ........................ | 119/792 |
| D645,213 | S * | 9/2011 | Silverman .................... | D30/152 |
| 2004/0000273 | A1 * | 1/2004 | Lady ............................. | 119/792 |
| 2006/0102102 | A1 * | 5/2006 | Bennett et al. ............... | 119/792 |
| 2006/0278179 | A1 * | 12/2006 | Vasquez et al. .............. | 119/864 |
| 2007/0266960 | A1 * | 11/2007 | Mugford ...................... | 119/792 |
| 2010/0122667 | A1 * | 5/2010 | Horgan ........................ | 119/792 |
| 2012/0060770 | A1 * | 3/2012 | Broock ........................ | 119/864 |
| 2012/0192811 | A1 * | 8/2012 | Robinson ..................... | 119/862 |
| 2014/0245970 | A1 * | 9/2014 | Wilson et al. ................ | 119/864 |
| 2015/0007778 | A1 * | 1/2015 | Yamin .......................... | 119/792 |

FOREIGN PATENT DOCUMENTS

WO WO2009/025018 * 2/2009 ............ A01K 27/00

* cited by examiner

*Primary Examiner* — Andrea Valenti
(74) *Attorney, Agent, or Firm* — Erik Vieira

(57) ABSTRACT

A dog harness is comprised of a torso strap encircling a dog's chest, connected to a chest strap passing around the chest of a dog, and a shoulder strap passing over the back of a dog. The chest strap is provided with a elongate linker. A leash connector is fixed to both ends of the elongate linker. When a leash is attached to either leash connector, a directional pull on the leash causes the leash connector to slide in the direction of the pull, pulling the elongate linker to the side creating a noise detectable by the animal to assist in the training of the animal. If the leash becomes tight pulling the elongate linker all the way to the side it will move the pull off the center of the dog's chest, thus decreasing the opposition reflex.

22 Claims, 9 Drawing Sheets

DOG HARNESS

This is a continuation-in-part application of Ser. No. 14/240,728, filed Feb. 24, 2014, that claims priority based on PCT Application No. PCT/GB2012/051209, filed May 29, 2012. Said patent applications are incorporated herein by reference in their entirety.

TECHNICAL FIELD

This invention pertains to dog harnesses, more particularly to dog harnesses that allow an effective method of training the dog and when necessary allowing control of the dog.

BACKGROUND ART

Dog training and dog handling have many facets and one of the most important parts of dog training is the equipment created to teach the dog to walk. There are collars, head restraints and harnesses available in the market place today. Collars have been around virtually since man and dog got together, then came harnesses which were used to get dogs to pull sleds. Head restraint collars came into being in the latter part of the last century.

Harnesses have traditionally been devices that fit around the dog's body, encompassing the chest, with an anchor point that the leash attaches to and for the handler to hold the dog.

Harnesses in the prior art generally do not 'communicate' anything to the dog via sound, nor do they have any chain in connection with their design. Prior art harnesses are generally not designed to 'communicate' in any of their applications. Said harnesses generally are designed to 'restrain' the dog, e.g. to stop the dog's forward motion.

Many dog collars are not well accepted by the mainstream public, dog trainers or vets. Check chains that were used many years ago to communicate to dogs are now almost non-existent and not popular. Instead, harnesses and head collars have often taken the check chains' place. However, there is still a need for a piece of training equipment that can be used to communicate to the dog in a humane and acceptable manner. With the popularity of harnesses with dog owners and vets, as well the greater acceptance of the harnesses in dog training, a harness that communicates and one that is kind and gentle to the dog is desired.

SUMMARY OF THE INVENTION

This invention pertains to dog harnesses, more particularly to dog harnesses that allow an effective method of training the dog and when necessary allowing control of the dog. In its broadest form, the present invention provides a restraint for placement around a girth of an animal, the restraint including:
- at least one torso strap positioned on the lower shoulders of a dog;
- at least one torso strap positioned across the upper shoulders of a dog connected together by a ring connector creating a strap that encircles the torso;
- also attached to the rings at 90 degree angles are two straps adapted to pass around the front of the dog's chest;
- the end of each chest strap is attached to an elongate linker; and,
- the elongate linker is comprised of the linker passing through two apertures to connect to each chest strap and one or two rings attached to each end of the linker to act as stop and connection points.

Where the user applies a pulling force directed away from the girth of the animal and is applied to the stopper when the restraint is in a first, larger girth position, the harness allows movement of the elongate linker through the aperture throughout a plurality of second, smaller girth positions to a minimum girth position. The minimum girth position is substantially similar to that of the girth of the animal such that there is an absence of a restriction of the animal's girth.

Preferably, the "girth" of the animal is a chest of an animal Preferably, the movement of the elongate linker through the apertures provides a noise detectable by the animal. This noise can assist in the training of the animal.

In another preferred embodiment, the elongate linker is a chain. In yet another preferred embodiment, the linker is formed from a material that optimises the noise detectable by the animal to achieve an optimal training response in the animal. Preferably, the material is a chain having a gauge that is increased or decreased to optimise the noise detectable by the animal to achieve the optimal training response.

In yet another preferred embodiment, the restraint further includes devices to facilitate location and/or adjustment of the restraint about the girth of the animal. Preferably, the restraint includes buckles and adjustment slides on each strap, the belt being doubled at the belt end for passing through these devices, thereby lengthening or shortening the girth of the restraint.

In a preferred embodiment, the stopper of the restraint is suitable for engagement with a tether. In another preferred embodiment, the stopper of the restraint is permanently attached to a tether. In yet another embodiment, the aperture of the restraint is in the form of a ring, such as an O-ring or a D-ring. Preferably, the stoppers of the restraint are substantially annular.

The present invention is designed to be used on domestic dogs and as a training tool to train dogs to walk properly at heel. The harness' design is such that the chain tightens through the round metal rings at either end when the dog pulls forward, and can be used by left and right-handed handlers. The leash can be connected to either metal ring and the chain will slide and tighten in the handler's direction.

As the leash is pulled taught, the chain preferably tightens across the dog's chest, towards the side that the handler is standing on and as it does the chain slides over the steel ring, making an audible metallic sound that the dog can hear. The dog can hear this sound just before it reaches the extreme portion of the harness and the sound preferably acts as a pre-warning or early warning signal to the animal. The sound lets the dog know that the extreme end of the harness is about to be reached and therefore it can teach the dog to stop pulling before the dog gets to that extreme point of the harness.

The present invention thus allows the trainer or handler to then communicate with a verbal, audible sound at the precise moment that the chain makes its audible metallic sound. The invention therefore allows trainers and handlers to use current philosophies regarding operant conditioning, as the harness tightens and releases around the dog's chest area.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

Figure 1:
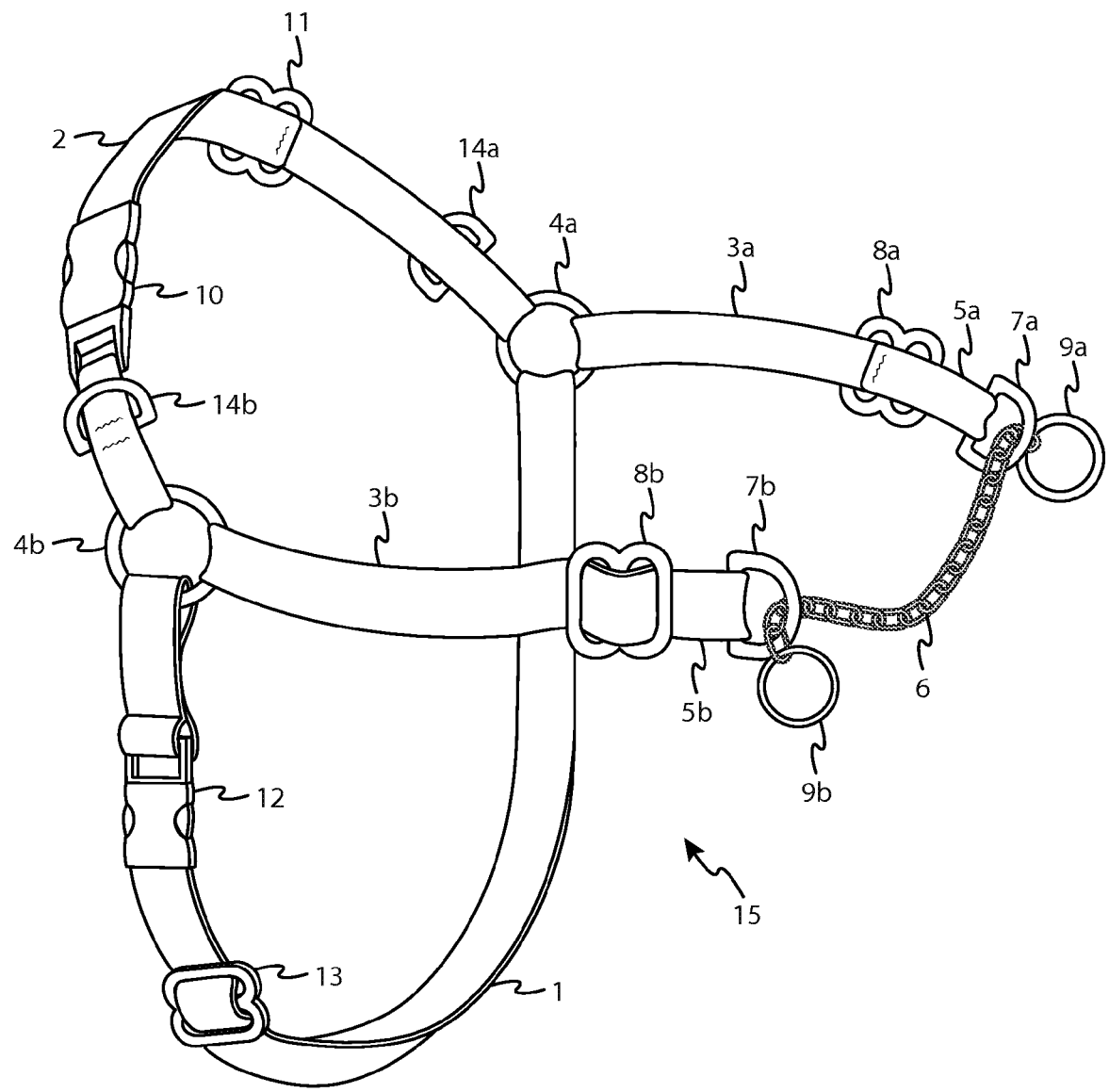
FIG. 1 shows a preferred embodiment of the invention with an elongate linker with leash connectors/stoppers on both ends of the linker.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details.

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s). The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide a dog harness.

Various types of ring connectors may be used. A circular ring connector can accommodate a number of straps, which are each free to rotate around the circle. A "rectangular connector" is a ring made of a durable material defining a rectangle, to which at least three straps may be attached. A rectangular connector does not permit any change of direction of the straps passing through it and is selected when a fixed angle of attachment is desirable. If two straps are to be attached through a rectangular connector, a narrow rectangular connector is chosen. If three or four straps are to be attached through a rectangular connector, the connector approaches a square. If three straps are to be connected, a triangular connector may be chosen. In describing this invention the "first connector" is the circular ring connector to which the shoulder, torso and chest straps are attached at each side of the harness.

A half-ring or "D-ring" connector permits rotation on the curved half of the D-ring and does not permit rotation on the flat half of the D-ring. A D-ring is preferred as the "second connector", with the flat side securely affixed to the end of each chest strap forming the apertures for the elongate linker. A circular ring connector is the preferred connector for each end of the linker providing a leash connector on one side and a stopper on the other.

In another embodiment, a single circular ring connector can be used to connect to both ends of the linker providing a leash connection point and taking away the need for a stopper as the elongate linker becomes a continuous loop.

In both embodiments as the leash is pulled taught, the chain tightens across the dog's chest towards the side that the handler is standing on and as it does it slides over the steel ring, making an 'audible' metallic sound that the dog hears. This sound is heard by the dog just before it reaches the extreme portion of the harness-it's a pre-warning-early warning signal, that lets the dog know that the extreme end of the harness is about to be breached and therefore it teaches the dog to stop pulling before it gets to that extreme point of the harness. If the extreme end of the harness is reached the dog will turn in the direction of the pull because the elongate linker will move the center of balance to the right or left leaving the dog facing the handler allowing the handler to refocus the dog and start training again.

An "adjustment slide" is a narrow rectangular connector with a center bar. In this invention, an adjustment slide is used on upper shoulder, lower torso, and both chest straps to provide maximum adjustability for all body shapes and sizes. The adjustment slide is firmly fixed by the center bar to one strap, while a connecting strap is passed through one side, over the center bar and through the second side. The proportions of the adjustment slide relative to the strap material are such that the connecting strap can be pulled with a firm force through the adjustment slide, but normal movements of the dog will not cause slipping.

A "elongate linker" assembly's length may be any length may be any length depending on the overall size of the harness, but is generally from two to eight inches long.

Many kinds of releasable connectors are useable in this invention. For convenience, the term "buckle" is used, but any other releasable connector may be substituted without going outside the scope of the attached claims. Illustrated is the preferred buckle, a quick-release buckle, but a standard buckle, hooks or hook-and-loop fastener may also be used.

Any material may be used for the straps. Webbing is the preferred material because of its comfort and adjustability. It can easily be sewn to securely affix two parts and can be pulled through slide connectors with force and will remain in position. Webbing may be made of nylon, cotton or other materials. The end of a strap pulled through any connector should be turned to the outside of the harness to avoid rubbing on the skin of the dog.

There are many prior art harnesses. Those with the leash connector at the top of the shoulder or the back will transmit pressure to the center of the chest when the dog pulls, triggering the opposition reflex and inducing the dog to pull forward.

Referring now to FIG. 1, the harness 15 generally includes an under torso strap 1, an over shoulder strap 2, and two chest straps 3a and 3b all attached at 90 degrees to each other through the first connectors 4a and 4b is shown. Any connector suitable for the attachment of the three straps may be used.

The far end of the chest straps 5a and 5b pass through the adjustment slides 8a and 8b then wrap through the apertures of the elongate linker 7a and 7b and are attached to the center bar of the adjustment slides. The linker 6 passes through each of the apertures 7a and 7b and the ends are attached to two circular ring connectors 9a and 9b, one forming the leash connection point and the other acting as a stopper. With two circular connection rings 9a and 9b the dog can be walked from either side by changing which ring is the connection and which ring is the stopper providing equal and opposite effect on the dog no matter which side the handler decides to walk the dog. A buckle 10 is attached to any point on the upper shoulder strap to allow the strap to be opened and an adjustment slide 11 is placed near the buckle 10. A second buckle 12 with adjustment slide 13 may be placed on the lower torso strap 1 to allow the lower torso strap to be opened as well. If the second buckle 12 is not utilized an adjustment slide will be put close to one of the first connectors 4a or 4b to still allow adjustability in the lower torso strap 1. Attached just above the first connectors 4a and 4b on the upper shoulder strap 2 are two half-ring (D-ring) connectors 14a and 14b, used for close quarter walking or off leash training.

Figure 2:
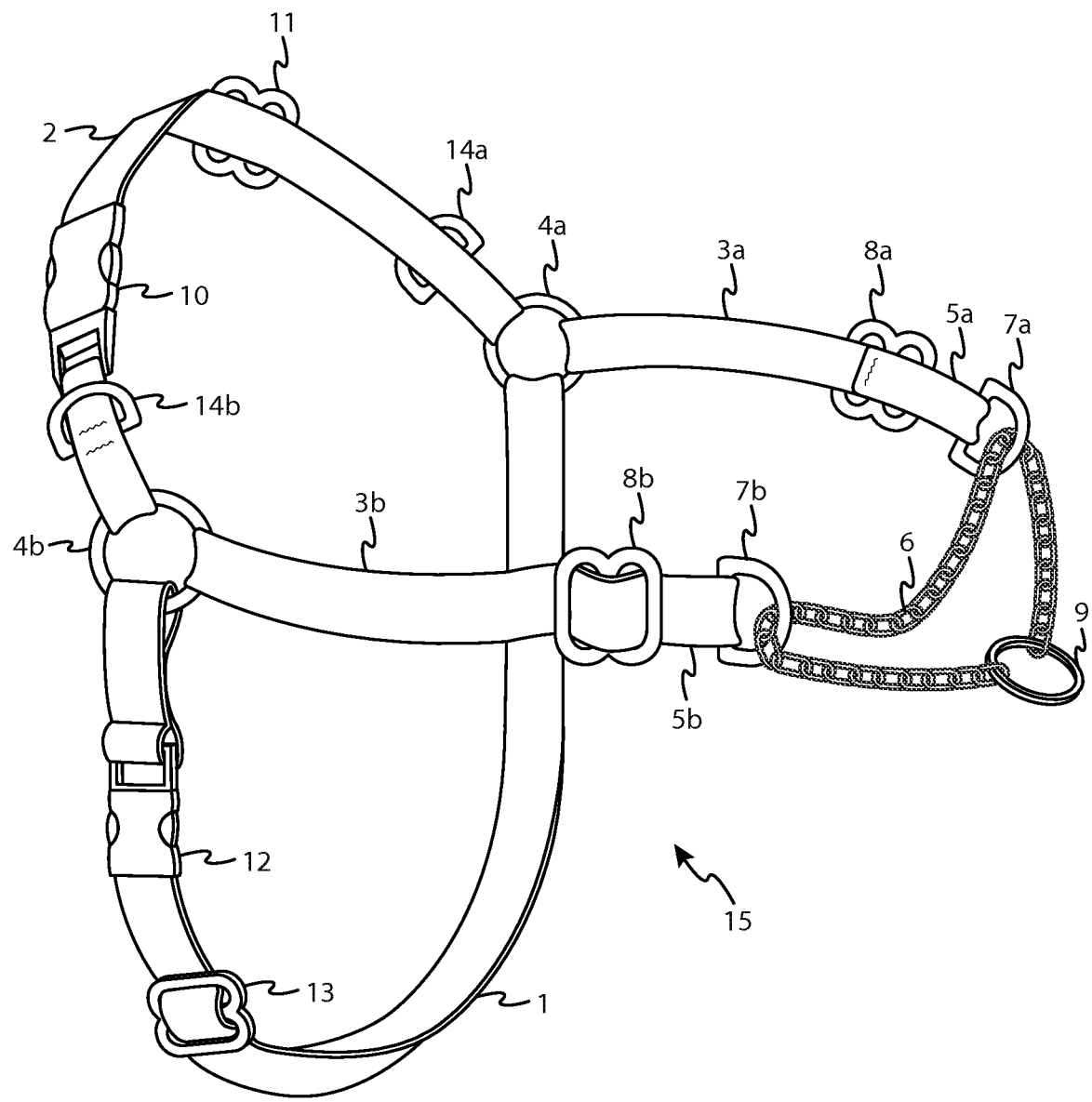
FIG. 2 shows a preferred embodiment of the invention with an elongate linker with one common leash connector with both ends of the linker attached to the same connector forming a loop.

Referring now to FIG. 2, the harness 15 generally includes an under torso strap 1, an over shoulder strap 2, and two chest straps 3a and 3b all attached at 90 degrees to each other through the first connectors 4a and 4b is shown. Any connector suitable for the attachment of the three straps may be used. The far end of the chest straps 5a and 5b pass through the adjustment slides 8a and 8b then wrap through the apertures of the elongate linker 7a and 7b and are attached to the center bar of the adjustment slides. The linker 6 passes through each of the apertures 7a and 7b and the ends are attached to a single circular ring connector 9. With one circular connection ring, the dog can be walked from either side providing equal and opposite effect on the dog no matter which side the handler decides to walk the dog. A buckle 10 is attached to any point on the upper shoulder strap to allow the strap to be opened and an adjustment slide 11 is placed near the buckle 10. A second buckle 12 with adjustment slide 13 may be placed on the lower torso strap 1 to allow the lower torso strap to be opened as well. If the second buckle 12 is not utilised an adjustment slide will be put close to one of the first connectors 4a or 4b to still allow adjustability in the lower torso strap 1. Attached just above the first connectors 4a and 4b on the upper shoulder strap 2 are two half-ring (D-ring) connectors 14a and 14b, used for close quarter walking or off leash training.

Figure 3:
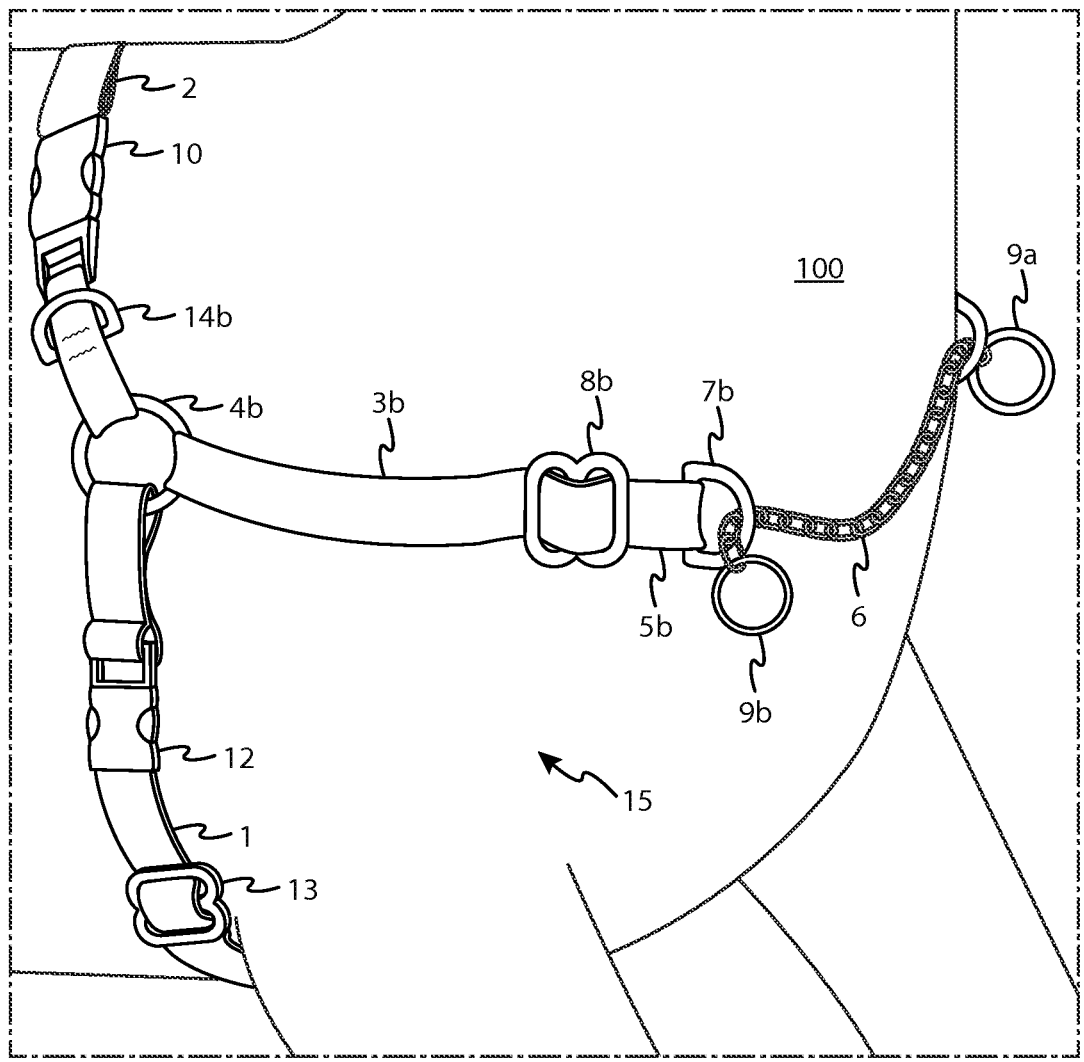
FIG. 3 shows a side view of a preferred embodiment of the invention on the torso of a dog.

Referring now to FIG. 3, the harness 15 on a dog 100 with a view from the side to show proper fitting of the harness is shown. The lower torso strap 1 and the upper shoulder strap 2 should form a circle with a slight deviation towards the chest strap 3b. The straps 1 and 2 should be adjusted to a comfortably snug fit on the dog 100. The chest strap 3b should preferably be adjusted until it is horizontal or parallel to the ground and not pulling the torso-shoulder circle too far forward.

Figure 4:
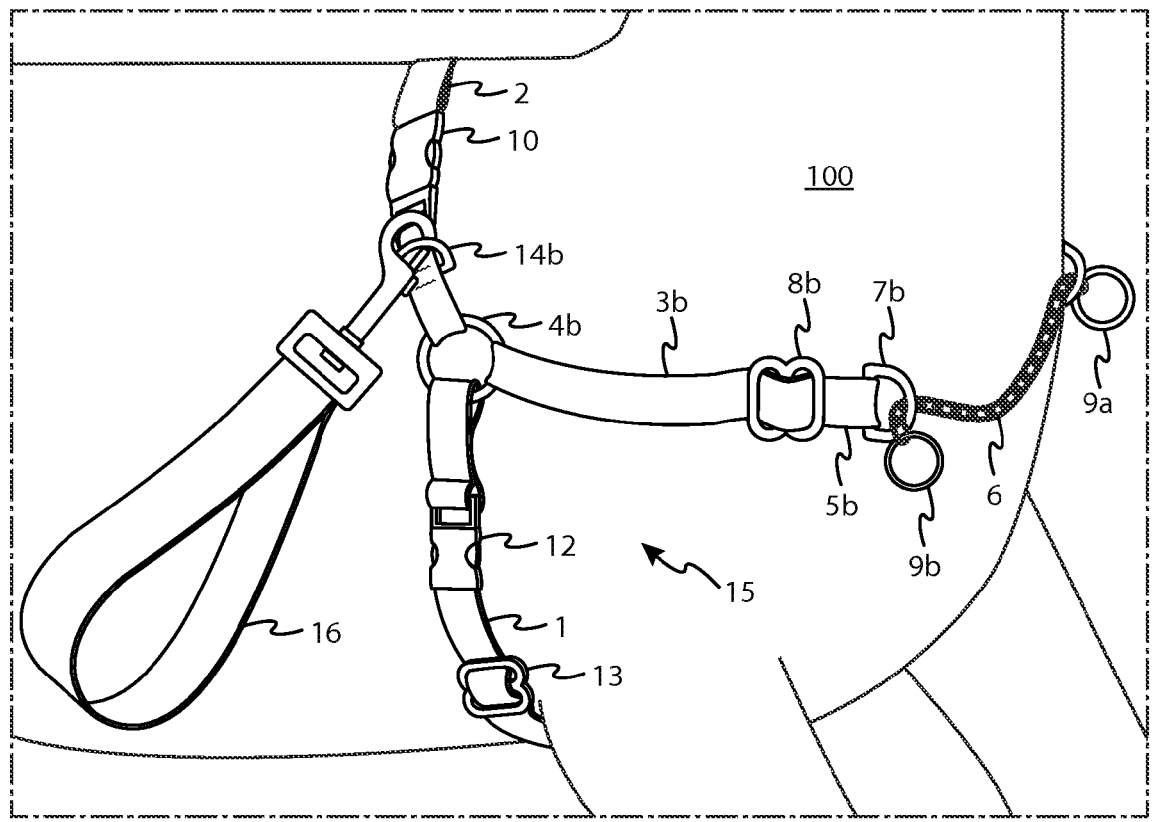
FIG. 4 shows a side view of a preferred embodiment of the invention on the torso of a dog with a leash connected to one of two side connectors for close quarters walking or off leash training.

Referring now to FIG. 4, the harness 15 on a dog 100 with a view from the side to show the attachment of a short leash 16 to the D-ring 14b for the purpose of close quarter walking or utilizing steps to teaching off leash walking is shown.

Figure 5:
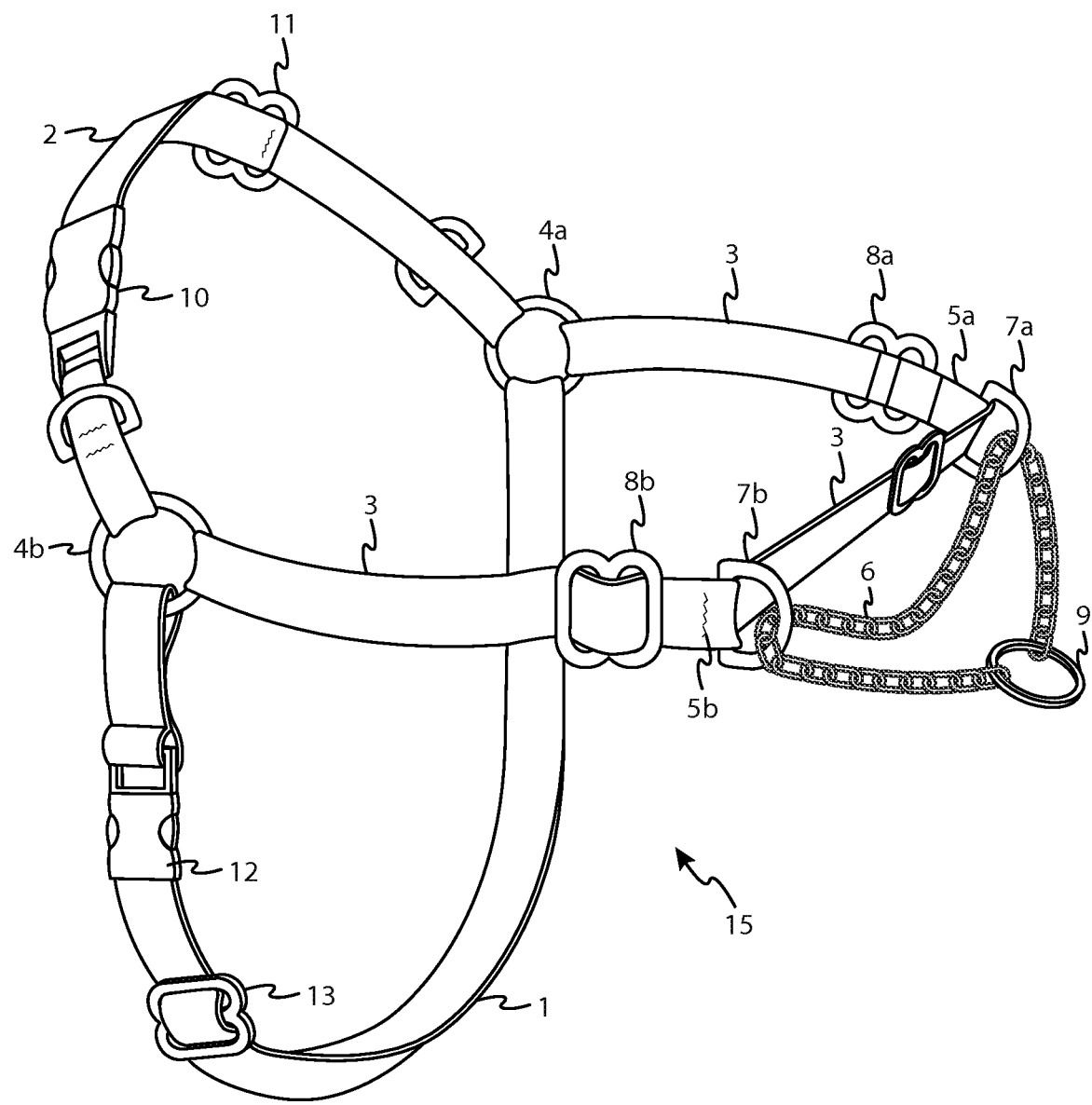
FIG. 5 shows a side perspective view of an alternative preferred embodiment with a chest strap and an elongate linker with one ring.

Referring now to FIG. 5, an alternative embodiment of the harness 15 is shown. The harness can include an under torso strap 1, an over shoulder strap 2, and one chest strap 3. Each strap 1, 2 and 3 is preferably attached at 90 degrees to each other through the first connectors 4a and 4b. A continuous chest strap 3 will preferably provide greater adjustability and provide a barrier between the elongate linker 6 and the dog in contrast to the embodiment in FIG. 1. As shown, the chest strap 3 can be sown behind the connectors 7a and 7b at points 5a and 5b to improve fit. The elongate linker 6 in either FIGS. 1 (two rings) or 2 (one ring) can be used with this embodiment.

Figure 6:
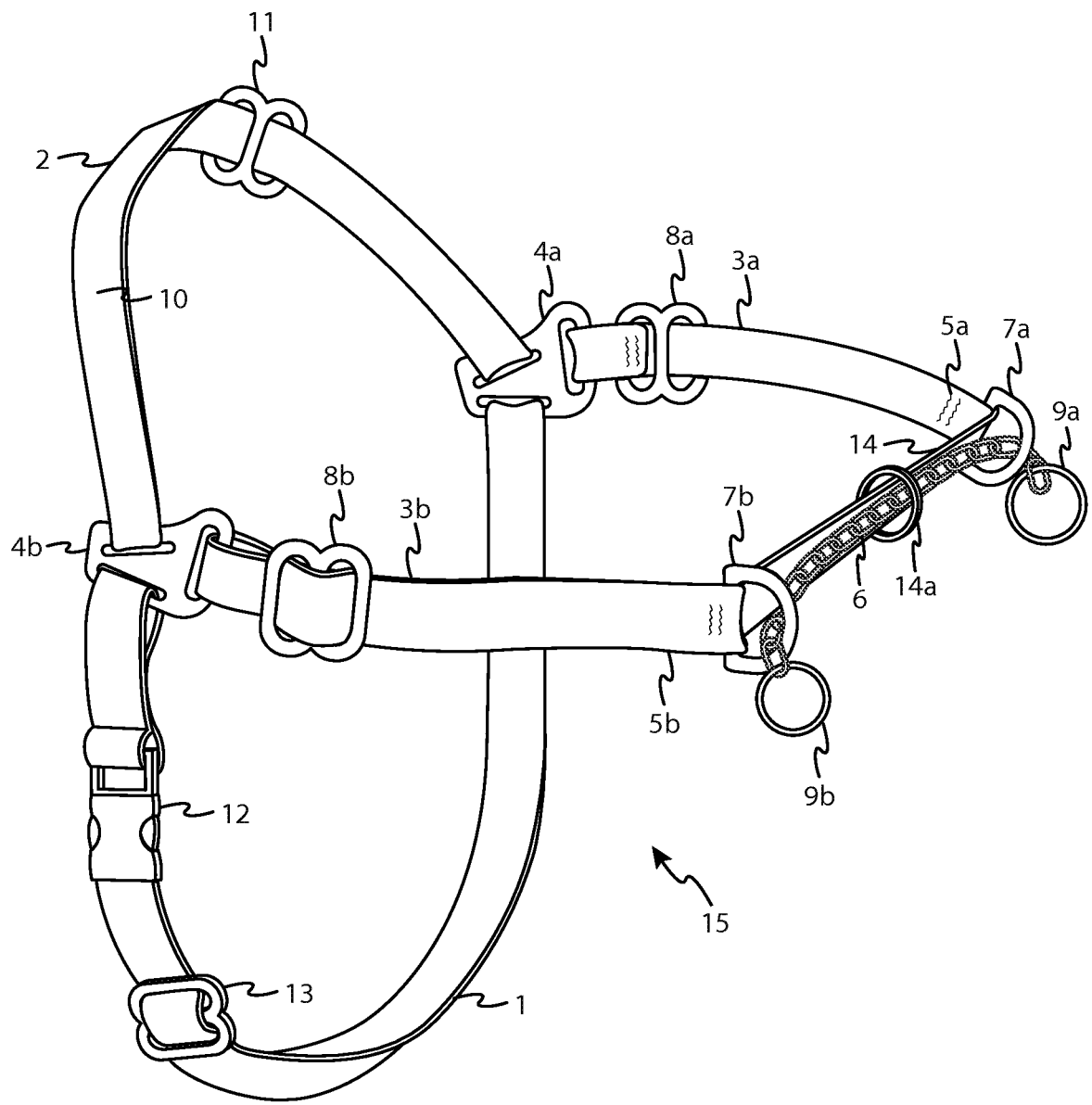
FIG. 6 shows a side perspective view of an alternative preferred embodiment with a chest strap and an elongate linker with two rings.
Figure 9:
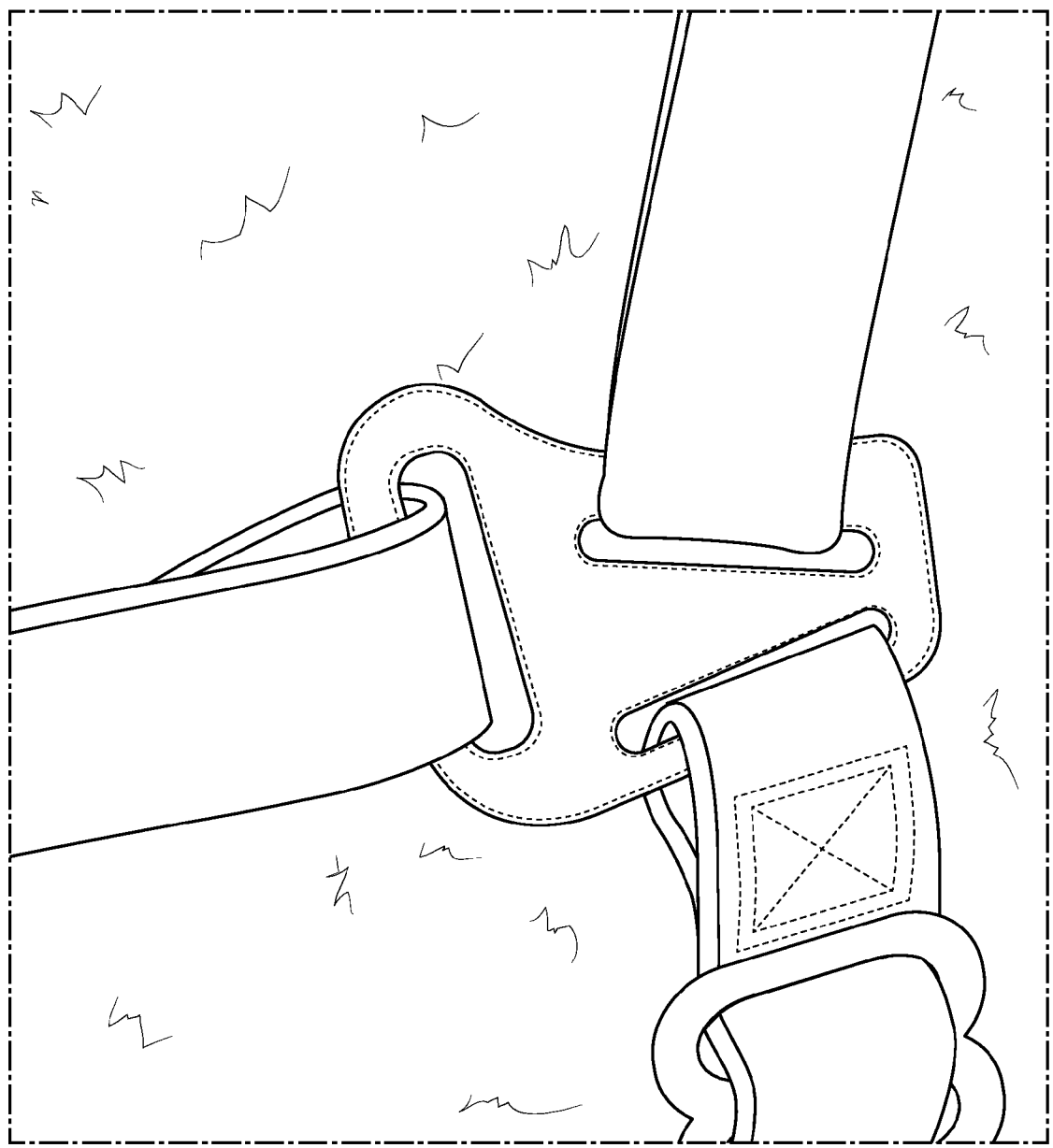

Referring now to FIG. 6, another alternative preferred embodiment is shown. The chest strap now comprises straps 3a and 3b with a separate strap 14 behind the elongate linker 6. The elongate linker 6 shown in FIG. 6 has two rings 9a and 9b. The separate strap 14 is preferably 1 to 1.5 inches shorter than the elongate linker 6 to provide a closer fit to the animal's chest and to remain positioned behind the linker 6. The separate strap 14 is also preferably made of webbing (e.g. nylon) or elastic material and different from straps 3a and 3b. The separate strap 14 is also preferably sewn to straps 3a and 3b at points 5a and 5b respectively and preferably also comprises an elongate linker guide 14a. The linker guide 14a is used to prevent the linker 6 from sagging out of position and preferably made of webbing. Also shown in FIG. 6 are triangular connectors 4a and 4b. A "triangular" connector" is a connector preferably made of a durable material defining a triangle, to which at least three straps may be attached. A close up view of a triangular connect is shown in FIG. 9. A triangular connector preferably does not permit any change of direction of the straps passing through it and is selected when a fixed angle of attachment is desirable.

Figure 7:
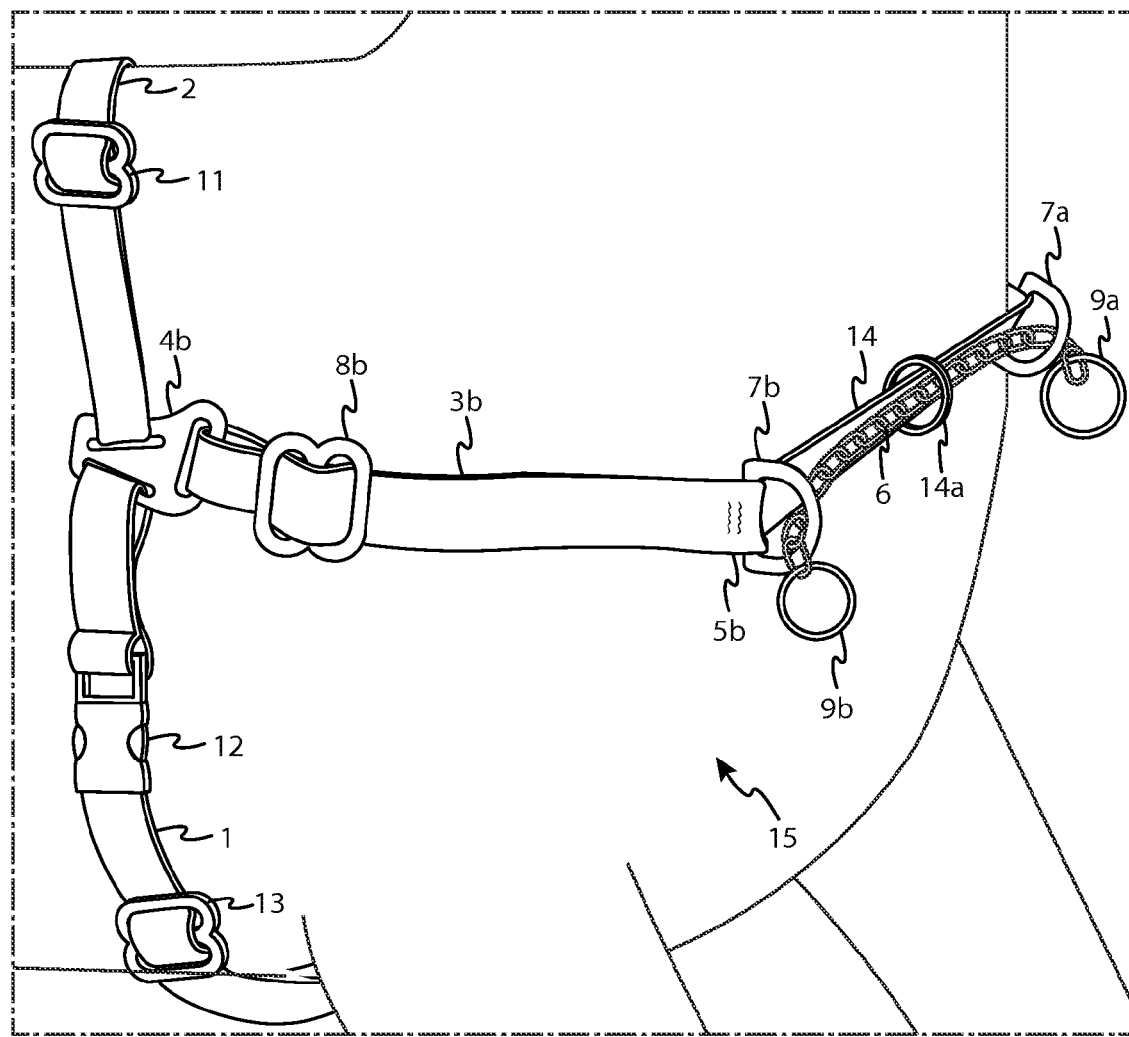
FIG. 7 shows a side perspective view of the alternative preferred embodiment in FIG. 6 on the torso of an animal.
Figure 8:
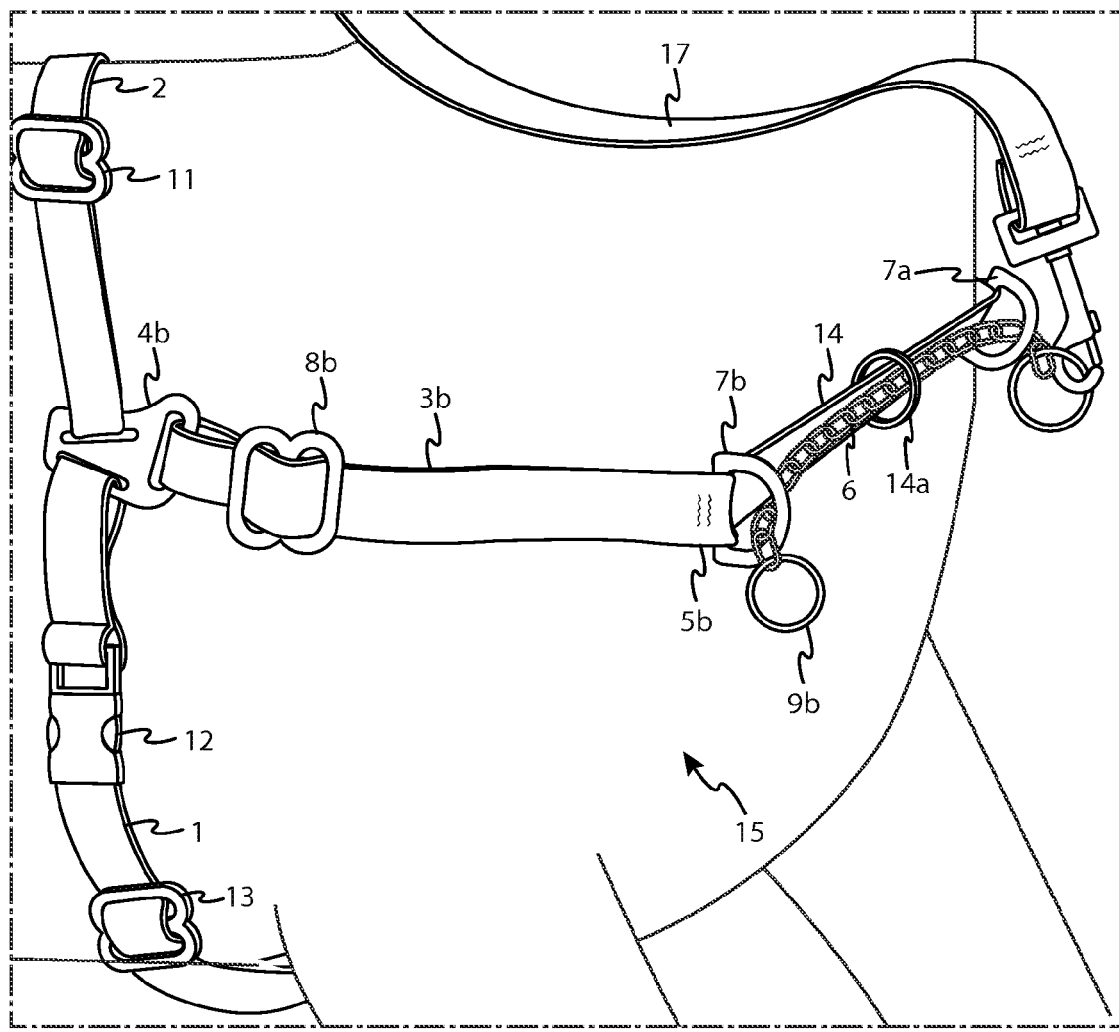
FIG. 8 shows a side perspective view of the alternative preferred embodiment in FIG. 6 on the torso of an animal with a leash attached to one of the rings on the elongate linker; and, FIG. 9 shows a side perspective view of a triangular connector.

FIG. 7 shows the embodiment shown in FIG. 6 on the body of an animal. FIG. 8 shows the same embodiment with a leash 17 attached to leash connector 9a.

As made clear by the embodiments described above, the design of the harness 15 is such that there is no proportionally continuous tightening of the harness 15 with the continued movement of the animal and/or a continued pulling force applied to the leash connector 9a or 9b, beyond a girth substantially similar to the girth of the animal about which the harness 15 is placed. This feature thus prevents restriction of the girth of the animal. Preferably, after repeated use, an association is formed by the animal between the sound of the linker 6 moving through one of the apertures 7a or 7b, and the animal's failure to comply with a command by a trainer or an owner. The animal thus perceives the sound as a warning sound, and will modify its behaviour to prevent the sound from being initiated. Such conditioned responses to an auditory cue may thus provide a behavioural change in the animal, which can be useful in training the animal. For example, if the animal is wearing the harness 15 and is walking on a leash at a pace which exceeds a pace set by a handler holding the leash, or if the animal fails to obey a 'stop' command, the sound of the linker 6 moving through one of the apertures 7a or 7b, will be initiated. The handler of the dog may provide verbal communication to the animal, which reinforce that the noise of the linker 6 moving through one of the apertures 7a or 7b is an indicator that the animal is not behaving in an appropriate manner, and that the sound is a warning sound. As such, the animal may, for example, learn to slow a pace or cease pulling altogether in response to a command, in order to prevent the sound of the linker 6 of the harness 15 moving.

Unlike harnesses with fixed leash connectors in the prior art, the non-restricting feature of the harness 15 allows for use of the harness 15 in a training mode and a non-training mode. That is, the harness 15 can be worn by the animal when a handler is enforcing certain verbal or visual commands, but if such a training session is not occurring (i.e. the animal is merely being exercised, without coincidental training), the harness 15 can also be used during this non-training mode, as it will not restrict the animal's range of motion. The non-training mode is either when the leash is removed or when the leash is connected to the ring (9a or 9b) nearest to the handler, depending on which side the handler is walking. The training mode is when the leash 17 is connected to the ring (9a or 9b) that is further away from the handler.

Thus, an improved dog harness is described above. In each of the above embodiments, the different positions and structures of the present invention are described separately in each of the embodiments. However, it is the full intention of the inventor of the present invention that the separate aspects of each embodiment described herein may be combined with the other embodiments described herein. Those skilled in the art will appreciate that adaptations and modifications of the just-described preferred embodiment can be configured without departing from the scope and spirit of the invention. Therefore, it is to be understood that, within the scope of the appended claims, the invention may be practiced other than as specifically described herein.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A harness for placement around a girth of an animal, the harness including at least one upper shoulder strap, at least one lower torso strap, two chest straps, an elongate linker terminating with at least one circular ring connector, a separate strap disposed behind the elongate linker, and an elongate linker guide that encircles the separate strap and the elongate linker to prevent the elongate linker from sagging out of position; wherein the two chest straps end at respective apertures and the elongate linker extends through both apertures; and wherein the elongate linker is adapted to generate an audible metallic sound when the elongate linker slides through the apertures.

2. The harness of claim 1 wherein the elongate linker engages both chest straps, the linker passing through two apertures terminating at two circular ring connectors where each ring connector can act as a leash connector and the other as a stopper;
    wherein a pulling force directed away from the girth of the animal applied to the leash connector when the harness is in a first, larger girth position, allows movement of the elongate linker through the apertures throughout a plurality of smaller girth positions to a minimum girth position, the minimum girth position being similar to that of the girth of the animal such that it does not restrict the animal's girth or range of motion.

3. The harness of claim 1 wherein the elongate linker engages both chest straps, the linker passing through two apertures terminating at one common circular ring connector and the elongate linker forms a continuous loop;
    wherein a pulling force directed away from the girth of the dog applied to the leash connector when the harness is in a first, larger girth position, allows movement of the elongate linker through the apertures throughout a plurality of smaller girth positions to a minimum girth position, the minimum girth position being similar to that of the girth of the animal such that it does not restrict the animal's girth or range of motion.

4. The harness of claim 1, wherein the girth of the animal is around the chest of the animal.

5. The harness of claim 1, wherein the movement of the elongate linker through one or both of the apertures provides a noise detectable by the animal.

6. The harness according to claim 5, wherein the noise assists in the training of the animal.

7. The harness according to claim 1, wherein the elongate linker is a chain.

8. The harness of claim 7, wherein the chain is a twist-link chain.

9. The harness of claim 8, wherein the elongate linker material is a chain having a gauge that is increased or decreased to optimise the noise detectable by the animal to achieve the optimal training response.

10. The harness of claim 7, wherein the elongate linker is formed from a linker material that optimises the noise detectable by the animal to achieve an optimal training response in the animal.

11. The harness of claim 1, wherein the shoulder strap and torso strap are attached to a first connector at about a 180° angle to form a shoulder-torso circle, and the chest strap is attached at the first connector at a 90° angle to the shoulder-torso circle.

12. The harness of claim 1, wherein there is at least one adjustment slide on each of the shoulder, torso and chest straps.

13. The harness of claim 1, where there is at least one buckle on the shoulder or torso strap.

14. The harness of claim 1, wherein two half-circle connectors are attached to the upper shoulder strap to provide a leash attachment for close quarter walking or utilizing steps to teaching off leash walking.

15. The harness of claim 1, wherein one of the apertures of the harness is in the form of a ring.

16. The harness of claim 15, wherein the ring is an O-ring.

17. The harness of claim 15, wherein the ring is a D-ring.

18. The harness of claim 15, wherein one of the circular connection rings of the harness is in the form of a ring, rectangle, or square.

19. The harness of claim 18, wherein the connector is an O-ring.

20. The harness of claim 18, wherein the connector is a D-ring.

21. The harness of claim 18, wherein the connector is a rectangle connector.

22. The harness of claim 18, wherein the connector is a square connector.

* * * * *